United States Patent [19]
Tsuchida

[11] Patent Number: 5,268,791
[45] Date of Patent: Dec. 7, 1993

[54] LENS SYSTEM USING GRADED REFRACTIVE INDEX LENS COMPONENT

[75] Inventor: Hirofumi Tsuchida, Tokyo, Japan

[73] Assignee: Olympus Optical Co., Ltd., Tokyo, Japan

[21] Appl. No.: 975,016

[22] Filed: Nov. 12, 1992

[30] Foreign Application Priority Data

Nov. 13, 1991 [JP] Japan .................... 3-324028
May 15, 1992 [JP] Japan .................... 4-147992

[51] Int. Cl.$^5$ .................... G02B 3/00; G02B 9/16
[52] U.S. Cl. .................... 359/654; 359/739; 359/785
[58] Field of Search ............ 359/652, 654, 739, 785, 359/789, 790, 642

[56] References Cited

U.S. PATENT DOCUMENTS

| | | | |
|---|---|---|---|
| 4,755,039 | 7/1988 | Hattori | 359/654 |
| 4,998,807 | 3/1991 | Uzawa et al. | 359/654 |
| 5,059,005 | 10/1991 | Kawano | 359/654 |
| 5,172,272 | 12/1992 | Aoki | 359/654 |

FOREIGN PATENT DOCUMENTS 61-4012 1/1986 Japan .

OTHER PUBLICATIONS

L. G. Atkinson et al, "Design of a gradient-index photographic objective", *Applied Optics*, vol. 21, pp. 993-998, Mar. 15, 1982.
P. J. Sands, "Third-Order Aberrations of Inhomogeneous Lenses", *Journal of the Optical Society of America*, vol. 60, pp. 1436-1443, Nov. 1970.

*Primary Examiner*—Martin Lerner
*Assistant Examiner*—David R. Parsons
*Attorney, Agent, or Firm*—Cushman, Darby & Cushman

[57] ABSTRACT

A lens system comprising, in order from the object side, a first lens component having a positive refractive power, a second lens component having a negative refractive power and a thrid lens component having a positive refractive power; the first lens component or the third lens component being a radial type graded refractive index lens component. The lens system is composed of the lens component in a number as small as three and has favorable optical performance.

5 Claims, 4 Drawing Sheets

LENS SYSTEM USING GRADED REFRACTIVE INDEX LENS COMPONENT

BACKGROUND OF THE INVENTION a) Field of the invention

The present invention relates to a lens system which adopts a graded refractive index lens component and is to be used in cameras, etc.

b) Description of the prior art

Examples of photographic lens systems having F numbers not exceeding 2 or having large apertures which are to be used in silver salt cameras, Gaussian type lens systems are known. A lens system of this type comprises as many as six or seven lens elements, requires a high manufacturing cost and is large in dimensions thereof.

Further, known triplet type lens systems are known as lens systems each comprising a small number of lens elements. However, lens systems of the triplet type have a common defect that they have F numbers as large as 2.8 or higher, small apertures and produce remarkable curvature of field.

In order to correct the defects of the lens systems of the types described above, it is conceivable to use aspherical surfaces in these lens systems. However, it is impossible to remarkably reduce the number of the lens elements of the Gaussian type of lens systems by using aspherical surfaces therein, because Petzval's sums and chromatic aberration cannot be corrected by using the aspherical surfaces though spherical aberration, coma, distortion, etc. can be corrected favorably by using the aspherical surfaces. Further, it is impossible to correct curvature of field by using aspherical surfaces in the triplet type of lens systems.

Recently, it has been conceived to use, in lens systems, graded refractive index lens elements having refractive indices varying from location to location thereof. In particular, use of radial type graded refractive index lens elements makes it possible to correct spherical aberration, as favorably as in cases where it is corrected by using aspherical surfaces, in addition to Petzval's sums and chromatic aberration.

A lens system using radial type graded refractive index lens elements is exemplified by the lens system described on Pages 993-998, Applied Optics, Vol 21. This lens system has a composition illustrated in FIG. 1, wherein radial type graded refractive index lens elements which have shapes of concave lens elements and are made of materials having positive refractive powers are disposed symmetrically with regard to an aperture stop. This lens system consists of lens elements in a number as small as ⅓ of the number of the homogenous lens elements required for composing an ordinary lens system and has aberrations favorably corrected.

Further, as another example of a lens system using graded refractive index lens elements, there is known the lens system disclosed by Japanese Patent Kokai Publication No. Sho 61-4,012. This lens system is composed of two or three lens elements in total: a radial type graded refractive index lens element and one or two homogenous lens component.

The lens system described on pages 993-998 of Applied Optics Vol. 21 requires a high manufacturing cost since the two radial type graded refractive index lens elements are expensive. Further, when radial type graded refractive index lens elements are actually manufactured, these lens elements have refractive index distributions different from design refractive index distributions, whereby it is necessary to correct the differences by slightly varying curvature on the lens surfaces from design curvature at the manufacturing stage. When a lens system is composed of two radial type graded refractive index lens elements which produce differences in refractive index distributions as described above, however, it is impossible to correct the differences simply by varying curvature on the four lens surfaces. In such a case, the graded refractive index lens elements must be manufactured so as to have refractive index distributions which strictly coincide with design distributions and can hardly be prepared in practice.

Furthermore, the lens system disclosed by Japanese Patent Kokai Publication No. Sho 61-4,012 cannot have a large aperture due to a fact that it produces remarkable coma.

SUMMARY OF THE INVENTION

A primary object of the present invention is to provide a lens system which consists of a small number of lens components, has a high aperture ratio and features high optical performance.

The lens system according to the present invention comprises, in order from the object side, a first lens component having a positive refractive power, a second lens component having a negative refractive power and a third lens component having a positive refractive power; the first lens component or the third lens component being a radial type graded refractive index lens component.

Further, in the lens system according to the present invention, the first lens component or the third lens component is a graded refractive index lens component satisfying the following conditions (1), (2), (3) and (4):

$$N_1 < 0 \tag{1}$$

$$-0.6 < \phi_S/\phi_M < 0 \tag{2}$$

$$\nu_1 > 30 \tag{3}$$

$$N_2 \cdot f^4 > 1 \tag{4}$$

wherein the reference symbols $N_1$ and $N_2$ represent refractive index distribution coefficients, the reference symbols $\phi_S$ and $\phi_N$ designate refractive powers of surface and medium respectively, and the reference symbol f denotes a focal length of the lens system as a whole.

The lens system according to the present invention is of the triplet type in which the first lens component having the positive refractive power is the radial type graded refractive index lens component.

The ordinary triplet type of lens system generally consists of a first lens component having a positive refractive power, a second lens component having a negative refractive power and a third lens component having a positive refractive power. Since it is impossible to reduce Petzval's sum of this lens system, it produces remarkable curvature of field and cannot have an aperture ratio larger than F/2.8.

In the triplet type of lens system according to the present invention, however, chromatic aberration, Petzval's sum and spherical aberration are corrected at the same time by using the radial type graded refractive index lens component.

When a distance as measured from an optical axis in the direction perpendicular to the optical axis is represented by y, a refractive index at the radial distance y is designated by n(y), a refractive index as measured on the optical axis is denoted by $N_0$, and refractive index distribution coefficients are represented by $N_1, N_2, \ldots$, a refractive index distribution of the radial type graded refractive index lens component is expressed as follows:

$$n(y) = N_0 + N_1 y^2 + N_2 y^4 + \ldots$$

wherein the coefficients $N_1, N_2, \ldots$ have values which are different dependently on wavelengths. When the coefficient $N_i$'s for the d-line, F-line and C-line are represented by $N_{id}$, $N_{iF}$ and $N_{iC}$ respectively, an Abbe's numbers of the radial type graded refractive index lens component is expressed by the following formulae:

$$\nu_0 = (N_{0d} - 1)/(N_{0F} - N_{0C})$$

$$\nu_i = N_{id}/(N_{iF} - N_{iC})$$

wherein $i = 1, 2, \ldots$

According to the above-mentioned literature (pages 993-998, Applied Optics, Vol. 21), Petzval's sum PS of the radial type graded refractive index lens component is approximated by the following formula (i):

$$PS \approx (\phi_S/N_0) + (\phi_M/N_0^2) \ldots \qquad (i)$$

wherein the reference symbol $\phi_S$ represents a refractive power only of the surface of the radial type graded refractive index lens component, and the reference symbol $\phi_M$ designates a refractive power only of the medium of the radial type graded refractive index lens component.

The reference system $\phi_S$, which is given by the following formula (A), represents a power caused only by the surface of the radial type graded refractive index lens component; and the reference system $\phi_M$, which is given by the following formula (B), represents a power caused only by the medium of the radial type graded refractive index lens component:

$$\phi_S = (N_0 - 1)/R_1 + (1 - N_0)/R_2 \qquad (A)$$

$$\phi_M = -2 N_1 d \qquad (B)$$

where $R_1$ and $R_2$ denote radii of curvature of the object and image sides of the graded refractive index lens component, respectively, and the reference symbol d designates a thickness of the graded refractive index lens on an optical axis thereof.

Paraxial axial chromatic aberration PAC produced by the radial type graded refractive index lens component is approximated by the following formula (ii):

$$PAC \approx (\phi_S/\nu_0) + (\phi_M/\nu_1) \ldots \qquad (ii)$$

As is understood from the formula (i), Petzval's sum, or curvature of field, can be corrected by reversing signs of $\phi_S$ and $\phi_M$, and adequately selecting a ratio between values of $\phi_S$ and $\phi_M$.

Further, it will be understood from the formula (ii) that longitudinal chromatic aberration can be corrected by adequately selecting Abbe's number.

Further, it is possible to correct spherical aberration of the third order produced by the radial type graded refractive index lens component by selecting the coefficient $N_2$ as described on pages 1436-1443 of Optical Society of America, Vol. 60 (1970).

As is understood from the foregoing description, it is possible to correct Petzval's sum, paraxial axial chromatic aberration and spherical aberration at the same time by using a single radial type graded refractive index lens component. The radial type graded refractive index lens component is equivalent, in function, to a lens component which is made of a glass material which has a high refractive index and a low dispersing power, and permits optionally controlling an amount of spherical aberration to be produced.

In case of the triplet type of lens system according to the present invention which uses the radial type graded refractive index lens component as the first lens component, the lens system is configured so as to have corrected Petzval's sum, spherical aberration and curvature of field as well as high aperture ratio by using the radial type graded refractive index lens component as the first lens component.

In the triplet type of lens system, a marginal ray is the highest on the first lens component out of the three lens components. For this reason, it becomes easy to correct spherical aberration when the first lens component is the radial type graded refractive index lens component. Further, for correcting Petzval's sum, chromatic aberration and spherical aberration favorably in the lens system according to the present invention, it is desirable that the radial type graded refractive index lens component satisfies the conditions which are already mentioned above.

The conditions (1) and (2) are required for correcting Petzval's sum of the lens system.

Since the radial type graded refractive index lens component which is used in the lens system according to the invention has the positive refractive power, it is necessary that the lens component is made of a medium which has a positive refractive power for reducing Petzval's sum given by the formula (i). The condition (1) is required for this purpose. Further, it is desirable that the refractive power $\phi_S$ of the surface and the refractive power $\phi_M$ of the medium satisfy the condition (2). If either of these conditions is not satisfied, it will be impossible to correct petzval's sum favorably as is understood from the formula (i) and obtain favorable image surface. When these conditions are satisfied, the shape of the radial type graded refractive index lens component is that of a concave lens component, the refractive power of the graded refractive index lens component is positive and the refractive power of the graded refractive index lens component as a whole is positive.

The condition (3) is required for correcting chromatic aberration favorably. $\phi_S$ is weaker than $\phi_M$ so far as the condition (2) is satisfied. Further, it is necessary to enlarge the denominator of the second term in the formula (ii) for correcting chromatic aberration as is understood from this formula. If the condition (3) is not satisfied, it will be impossible to correct chromatic aberration favorably and maintain the little curvature of field image surface.

The condition (4) is required for correcting spherical aberration. If the condition (4) is not satisfied, spherical aberration will be undercorrected and it will be impossible to configure the lens system so as to have a large aperture.

For correcting aberrations more favorably in the lens system according to the present invention, it is desirable that the following conditions (5) and (6) are satisfied.

$$n_2 > 1.6 \qquad (5)$$

$$n_3 > 1.6 \qquad (6)$$

wherein the reference symbols $n_2$ and $n_3$ represent refractive indices of the second lens component and the third lens component respectively.

The conditions (5) and (6) are required for correcting coma favorably. If either of these conditions is not satisfied, remarkable coma of high order will undesirably be produced.

Further, the lens system according to the present invention has the composition described above and uses the third lens component which is a radial type graded refractive index lens component satisfying the following conditions (1), (2'), (3') and (4):

$$N_1 < 0 \qquad (1)$$

$$-0.5 < \phi_S/\phi_M < 0 \qquad (2')$$

$$\nu_1 > 40 \qquad (3')$$

$$N_2 \cdot f^4 > 1 \qquad (4)$$

In the lens system according to the present invention, the third lens component which is a cemented lens component in the Tessar type of lens system is designed as a graded refractive index lens component satisfying the above-mentioned conditions (1), (2'), (3') and (4).

The Tessar type of lens system generally consists of a first positive lens component, a second negative lens component, and a third lens component which consists of a negative lens element and a positive lens element cemented to each other. In other words, the Tessar type of lens system is equal to the triplet type of lens system in which the positive third lens component is replaced with the cemented lens component. In the Tessar type of lens system, chromatic aberration and Petzval's sum are corrected by using the cemented lens component, and the aggravation of curvature of field, which is one of the defects of the triplet type of lens system, is corrected owing to a fact that the cemented lens component is equivalent to a lens component which is made of a glass material having a high refractive index and a low dispersing power.

However, since the cemented lens component used in the Tessar type of lens system has a positive refractive power of the cemented surface, the Tessar type of lens system cannot have corrected spherical aberration, a high aperture ratio and an F number which is ordinarily not smaller than 2.8.

In the Tessar type of lens system according to the present invention, in contrast, chromatic aberration, Petzval's sum and spherical aberration are corrected at the same time by replacing the third lens component with the single radial type graded refractive index lens component.

For the reason described above, the Tessar type of lens system according to the present invention is configured so as to satisfy the above-mentioned conditions (1), (2'), (3') and (4). Significance of these conditions remain the same as that of the conditions (1), (2), (3) and (4).

Further, remarkable coma is produced in this lens system though Petzval's sum, paraxial axial chromatic aberration and spherical aberration can be corrected favorably by using the single radial type graded refractive index lens component. For correcting coma, it is desirable to configure the lens system so as to have a nearly symmetrical composition. For this reason, it is desirable in the lens system according to the present invention to dispose an aperture stop between the second lens component and the third radial type graded refractive index lens component, and cancel coma produced by the radial type graded refractive index lens component with coma which is produced by the first lens component and the second lens component.

DETAILED DESCRIPTION OF THE PREFERRED EMBODIMENTS

Figure 1:
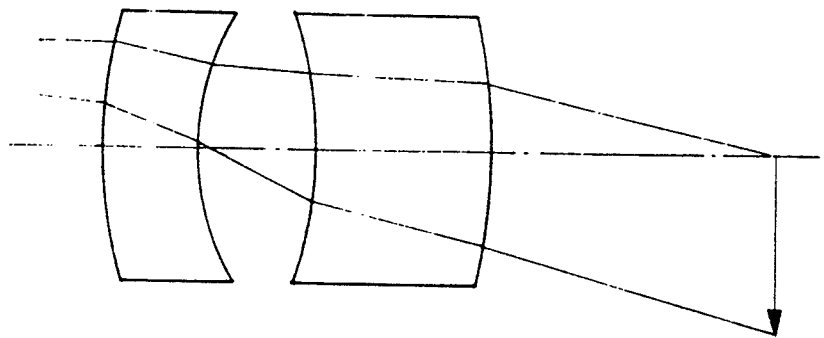
FIG. 1 shows a sectional view illustrating the composition of the conventional lens system.

Now, the present invention will be described more detail below with reference to the preferred embodiments illustrated in the accompanying drawings.

Embodiment 1

$f = 50.0$, $F/2.0$, $2\omega = 46.8°$
maximum image height = 21.6

$r_1 = 82.9385$
$d_1 = 11.6426$    $n_1$(graded refractive index lens)
$r_2 = 28.7892$
$d_2 = 5.1963$
$r_3 = \infty$ (stop)
$d_3 = 2.1895$
$r_4 = -159.5401$
$d_4 = 1.2000$    $n_2 = 1.76182$    $\nu_2 = 26.52$
$r_5 = 29.4570$
$d_5 = 4.5010$
$r_6 = 64.2367$
$d_6 = 4.5424$    $n_3 = 1.77250$    $\nu_3 = 49.66$
$r_7 = -37.2368$
(graded refractive index lens)
$N_0 = 1.73400$,    $N_1 = -1.4214 \times 10^{-3}$
$N_2 = 9.3467 \times 10^{-7}$,    $N_3 = -2.7814 \times 10^{-10}$
$N_4, N_5, \ldots = 0$,
$\nu_0 = 51.47$,    $\nu_1 = 60.00$
$\nu_2 = 60.00$,    $\nu_3 = 60.00$
$\phi_S/\phi_M = -0.47$,    $N_2 \cdot f^4 = 5.84$ Embodiment 2

$f = 50.0$, $F/1.8$, $2\omega = 46.7°$
maximum image height = 21.6

$r_1 = 74.9272$
$d_1 = 12.5620$    $n_1$ (graded refractive index lens)
$r_2 = 32.5593$
$d_2 = 5.0309$
$r_3 = \infty$ (stop)
$d_3 = 1.8789$
$r_4 = -102.8976$
$d_4 = 1.1898$    $n_2 = 1.80518$    $\nu_2 = 25.43$
$r_5 = 30.1704$
$d_5 = 4.3536$
$r_6 = 71.3046$
$d_6 = 4.5307$    $n_3 = 1.81600$    $\nu_3 = 46.62$ -continued r$_7$ = −34.9252
(graded refractive index lens)
N$_0$ = 1.71300, N$_1$ = −1.2000 × 10$^{-3}$
N$_2$ = 5.0812 × 10$^{-7}$, N$_3$ = 2.9369 × 10$^{-11}$
N$_4$, N$_5$, ... = 0
ν$_0$ = 53.85, ν$_1$ = 58.60
ν$_2$ = 58.60, ν$_3$ = 58.60
φ$_S$/φ$_M$ = −0.37, N$_2$·f$^4$ = 3.18

Embodiment 3 f = 50.0, F/2.0, 2ω = 46.7°,
maximum image height = 21.6
r$_1$ = 44.9342
d$_1$ = 8.7694  n$_1$ = 1.77250  ν$_1$ = 49.66
r$_2$ = −409.5004
d$_2$ = 7.2432
r$_3$ = −42.8274
d$_3$ = 1.2000  n$_2$ = 1.72151  ν$_2$ = 29.24
r$_4$ = 94.5537
d$_4$ = 1.2000
r$_5$ = ∞ (stop)
d$_5$ = 7.3475
r$_6$ = −57.1982
d$_6$ = 11.7438  n$_3$ (graded refractive index lens)
r$_7$ = −174.6559
(graded refractive index lens)
N$_0$ = 1.72000, N$_1$ = −1.4647 × 10$^{-3}$
N$_2$ = 6.4216 × 10$^{-7}$, N$_3$, N$_4$, ... = 0
ν$_0$ = 50.24, ν$_1$ = 74.72, ν$_2$ = 74.72
φ$_S$/φ$_M$ = −0.245, N$_2$·f$^4$ = 4.01

Embodiment 4 f = 50.0, F/1.4, 2ω = 46.7°
maximum image height = 21.6
r$_1$ = 51.3222
d$_1$ = 4.8000  n$_1$ = 1.78650  ν$_1$ = 50.00
r$_2$ = −914.1988
d$_2$ = 10.9963
r$_3$ = −43.6092
d$_3$ = 1.2000  n$_2$ = 1.70055  ν$_2$ = 30.11
r$_4$ = 120.5201
d$_4$ = 1.8000
r$_5$ = ∞ (stop)
d$_5$ = 9.4723
r$_6$ = −88.4646
d$_6$ = 10.1310  n$_3$ (graded refractive index lens)
r$_7$ = −189.0898
(graded refractive index lens)
N$_0$ = 1.77250, N$_1$ = −1.5475 × 10$^{-3}$
N$_2$ = 4.6440 × 10$^{-7}$, N$_3$ = −7.9995 × 10$^{-11}$
N$_4$, N$_5$, ... = 0
ν$_0$ = 49.61, ν$_1$ = 82.81,
ν$_2$ = 82.81, ν$_3$ = 82.81
φ$_S$/φ$_M$ = −0.146, N$_2$·f$^4$ = 2.90 wherein the reference symbols r$_1$, r$_2$, ... represent radii of curvature on the respective lens components, the reference symbols d$_1$, d$_2$, ... designate thicknesses of the respective lens components and airspaces reserved therebetween, the reference symbols n$_1$, n$_2$, ... denote refractive indices of the respective lens components, and the reference symbols ν$_1$, ν$_2$, ... represent Abbe's numbers of the respective lens components.

Figure 2:
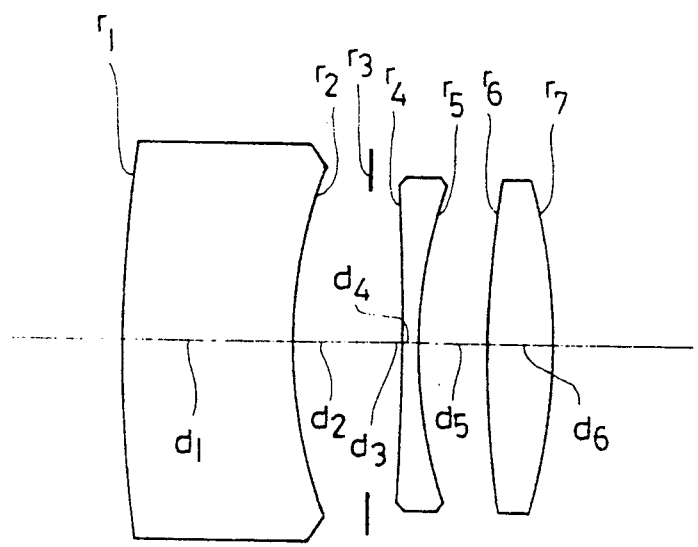
FIG. 2 shows a sectional view illustrating a composition of first embodiment and that of the second embodiment of the lens system according to the present invention.
Figure 5:
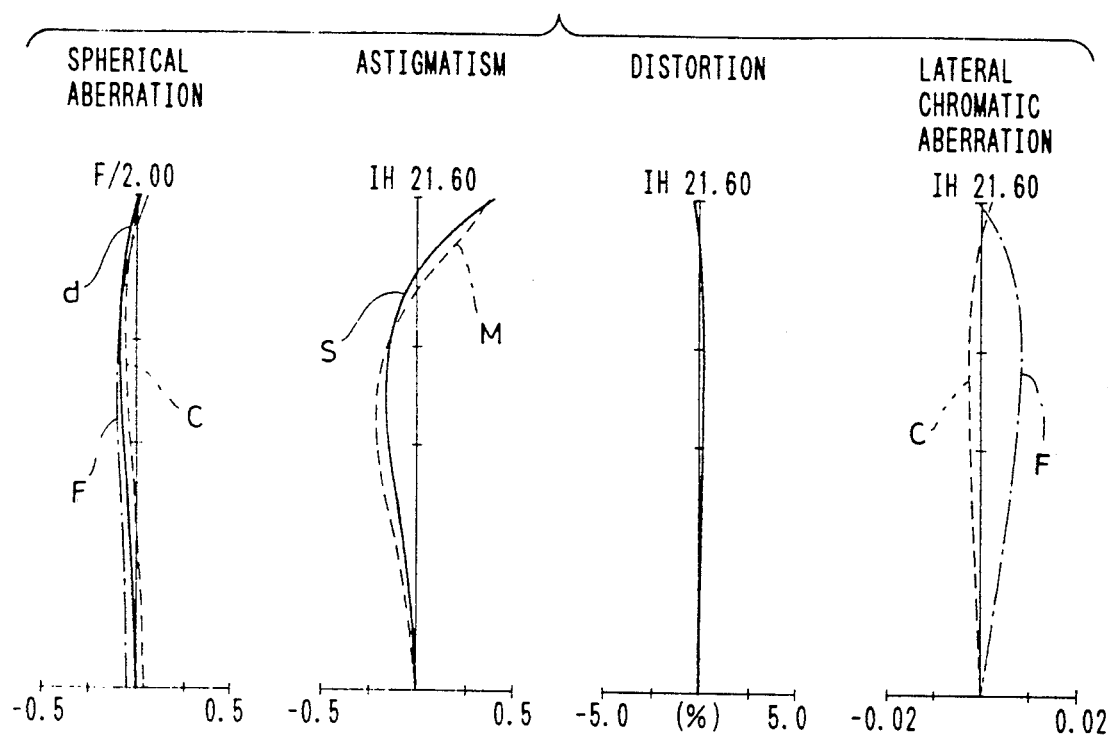
FIG. 5 through FIG. 8 show graphs illustrating aberration characteristics of the first through fourth embodiments of the present invention.

The first embodiment has the composition illustrated in FIG. 2, wherein the lens system consists of a first lens component which is a radial type graded refractive index lens component having a positive refractive power, a second lens component having a negative refractive power and a third lens component having a positive refractive power. The lens system preferred as the first embodiment has a focal length of 50 mm and an F number of 2.0 or a large aperture. An aperture stop is disposed between the first lens component and the second lens component so that coma of high order is reduced by making the lens system nearly symmetrical with regard to the aperture stop. The first embodiment has aberration characteristics for an object located at infinite distance which are shown in FIG. 5.

Figure 6:
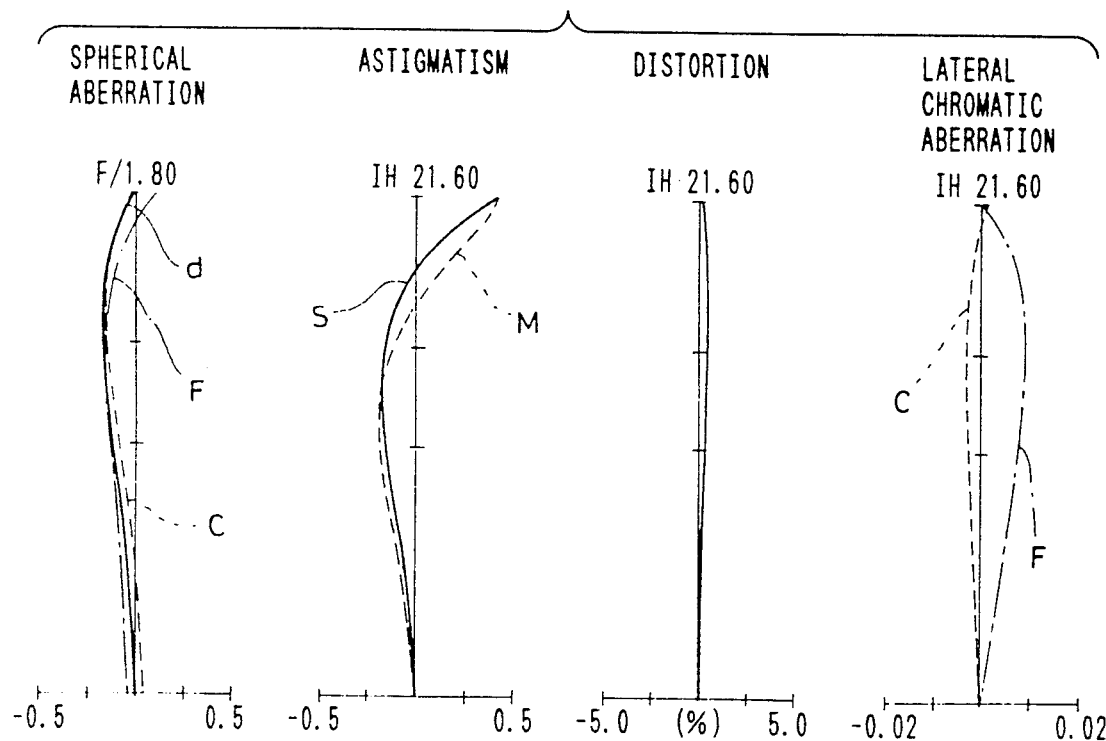

The second embodiment of the present invention has a composition which is similar to that of the first embodiment, a focal length of 50 mm and an F number of 1.8 or a very large aperture. The second embodiment has aberration characteristics for the object located at infinite distance which are shown in FIG. 6.

Figure 3:
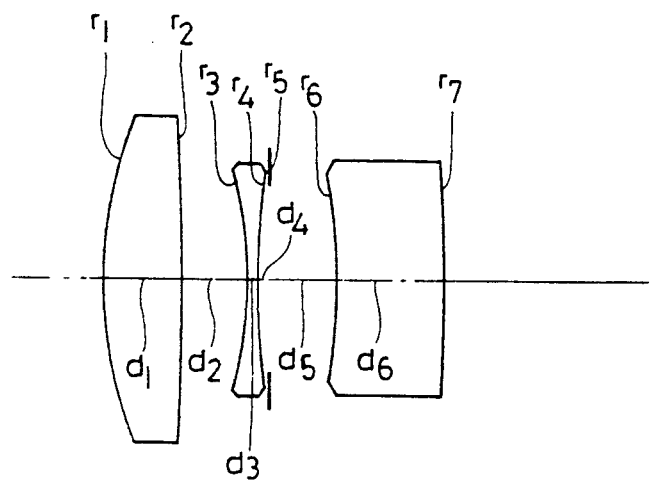
FIG. 3 shows a sectional view illustrating a composition of a third embodiment of the lens system according to the present invention.
Figure 7:
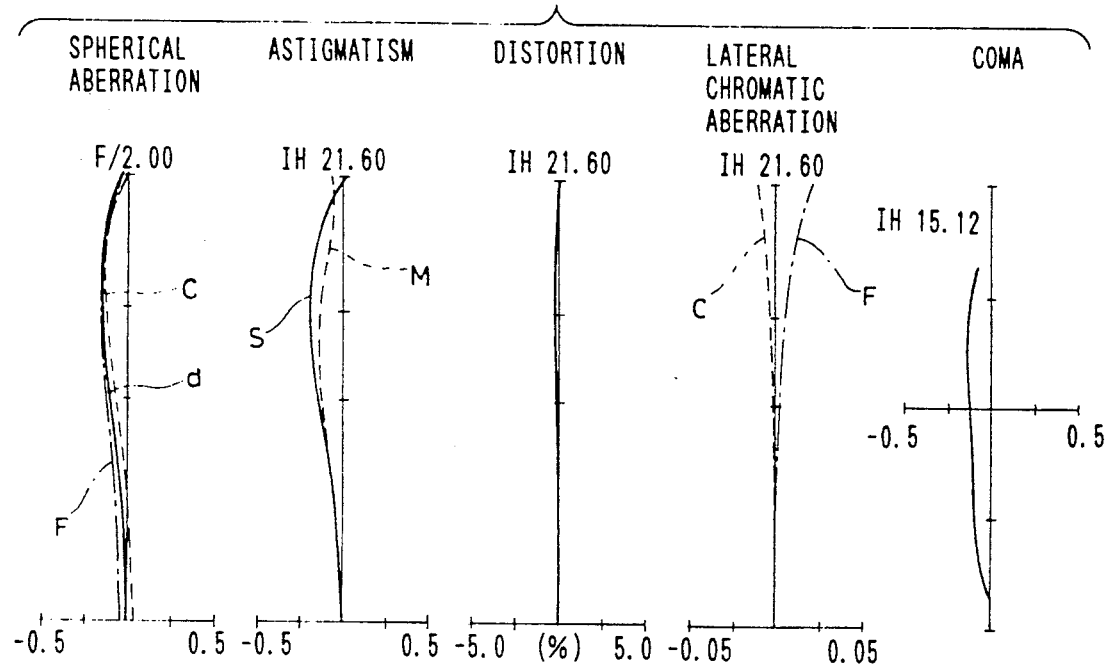

The third embodiment of the present invention has the composition illustrated in FIG. 3, wherein the lens system consists, in order from the object side, of a first lens component having a positive refractive power, a second lens component having a negative refractive power and a third lens component which is a radial type graded refractive index lens component having a positive refractive power. In the lens system preferred as the second embodiment, an aperture stop is disposed between the first lens component and the second lens component. The third embodiment has a focal length of 50 mm and an F number of 2.0 or a large aperture. Aberration characteristics of the third embodiment are illustrated in FIG. 7.

Figure 4:
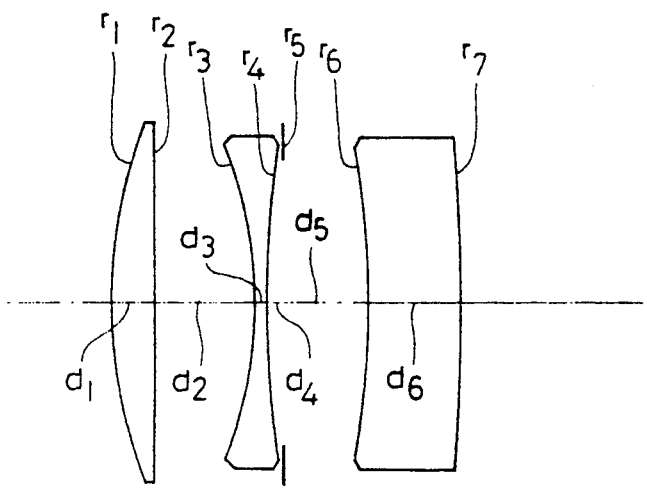
FIG. 4 shows a sectional view illustrating a composition of a fourth embodiment of the lens system according to the present invention.
Figure 8:
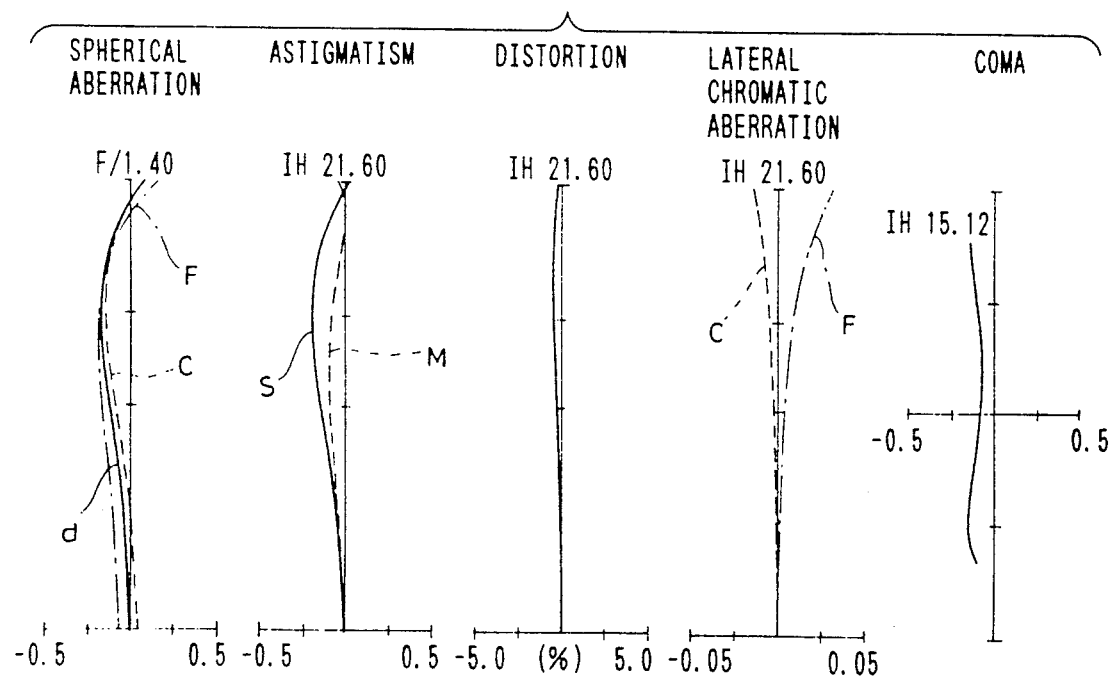

The fourth embodiment of the present invention has the composition which is similar to that of the third embodiment and illustrated in FIG. 4, wherein the lens system consists, in order from the object side, of a first lens component having a positive refractive power, a second lens component having a negative refractive power and a third lens component which is a radial type graded refractive index lens component having a positive refractive power. An aperture stop is disposed between the second lens component and the third lens component in the fourth embodiment. The fourth embodiment has a focal length of 50 mm and an F number of 1.4 or a very large aperture. Aberration characteristics of the fourth embodiment are visualized in FIG. 8.

As is clarified by the foregoing description, the lens system according to the present invention adopts a radial type graded refractive index lens component as the first lens component or the third lens component arranged therein, whereby the lens system comprises lens component in a number as small as three and has very favorable optical performance.

I claim:

1. A lens system comprising, in order from the object side:
   a first lens component which is a radial type graded refractive index lens component having a positive refractive power,
   a second lens component having a negative refractive power, and
   a third lens component having a positive refractive power;
   wherein a refractive index of said radial type graded refractive index lens component is expressed by the following formula and said graded refractive index lens component satisfies the following conditions (1), (2), (3) and (4):

$$n(y) = N_0 + N_1 y^2 + N_2 y^4 + \ldots$$

$$N_1 < 0 \quad (1)$$

$$-0.6 < \phi_S/\phi_M < 0 \quad (2)$$

$$\nu_1 > 30 \quad (3)$$

$$N_2 \cdot f^4 > 1 \quad (4)$$

wherein the reference symbols $N_1$ and $N_2$ represent coefficients expressing a refractive index distribution of said graded refractive index lens component, the reference symbol $N_0$ represents the value of the refractive index of said graded refractive index lens component on an optical axis, the reference symbol y represents a distance as measured from the optical axis in a direction perpendicular thereto, the reference symbols $\phi_S$ and $\phi_M$ designate refractive powers of a surface and a medium respectively of said graded refractive index lens component, the reference symbol $v_1$ denotes a coefficient expressing an Abbe's number of the medium of said graded refractive index lens component, and the reference symbol f represent a focal length of said lens system as a whole.

2. A lens system according to claim 1 satisfying the following conditions (5) and (6):

$$n_2 > 1.6 \qquad (5)$$

$$n_3 > 1.6 \qquad (6)$$

wherein the reference symbols $n_2$ and $n_3$ represent refractive indices of said second lens component and said third lens component respectively.

3. A lens system according to claim 2 wherein an aperture stop is disposed between said first lens component and said second lens component.

4. A lens system comprising, in order from the object side:

a first lens component having a positive refractive power, a second lens component having a negative refractive power, and a third lens component which is a graded refractive index lens component having a positive refractive power;

wherein a refractive index of said radial type graded refractive index lens component is expressed by the following formula and said graded refractive index lens component satisfies the following conditions (1), (2'), (3') and (4):

$$n(y) = N_0 + N_1 y^2 + N_2 y^4 + \ldots$$

$$N_1 < 0 \qquad (1)$$

$$-0.5 < \phi_S/\phi_M < 0 \qquad (2')$$

$$v_1 > 40 \qquad (3')$$

$$N_2 \cdot f^4 > 1 \qquad (4)$$

wherein the reference symbols $N_1$ and $N_2$ represent coefficients expressing a refractive index distribution of said graded refractive index lens component, the reference symbol $N_0$ represents the value of the refractive index of said graded refractive index lens component on an optical axis, the reference symbol y represents a distance as measured from the optical axis in a direction perpendicular thereto, the reference symbols $\phi_S$ and $\phi_M$ designate refractive powers of a surface and a medium respectively of said graded refractive index lens component, the reference symbol $v_1$ denotes a coefficient expressing an Abbe's number of the medium of said graded refractive index lens component, and the reference symbol f represent a focal length of said lens system as a whole.

5. A lens system according to claim 4 wherein an aperture stop is disposed between said second lens component and said third lens component.

* * * * *